Patented Aug. 10, 1948

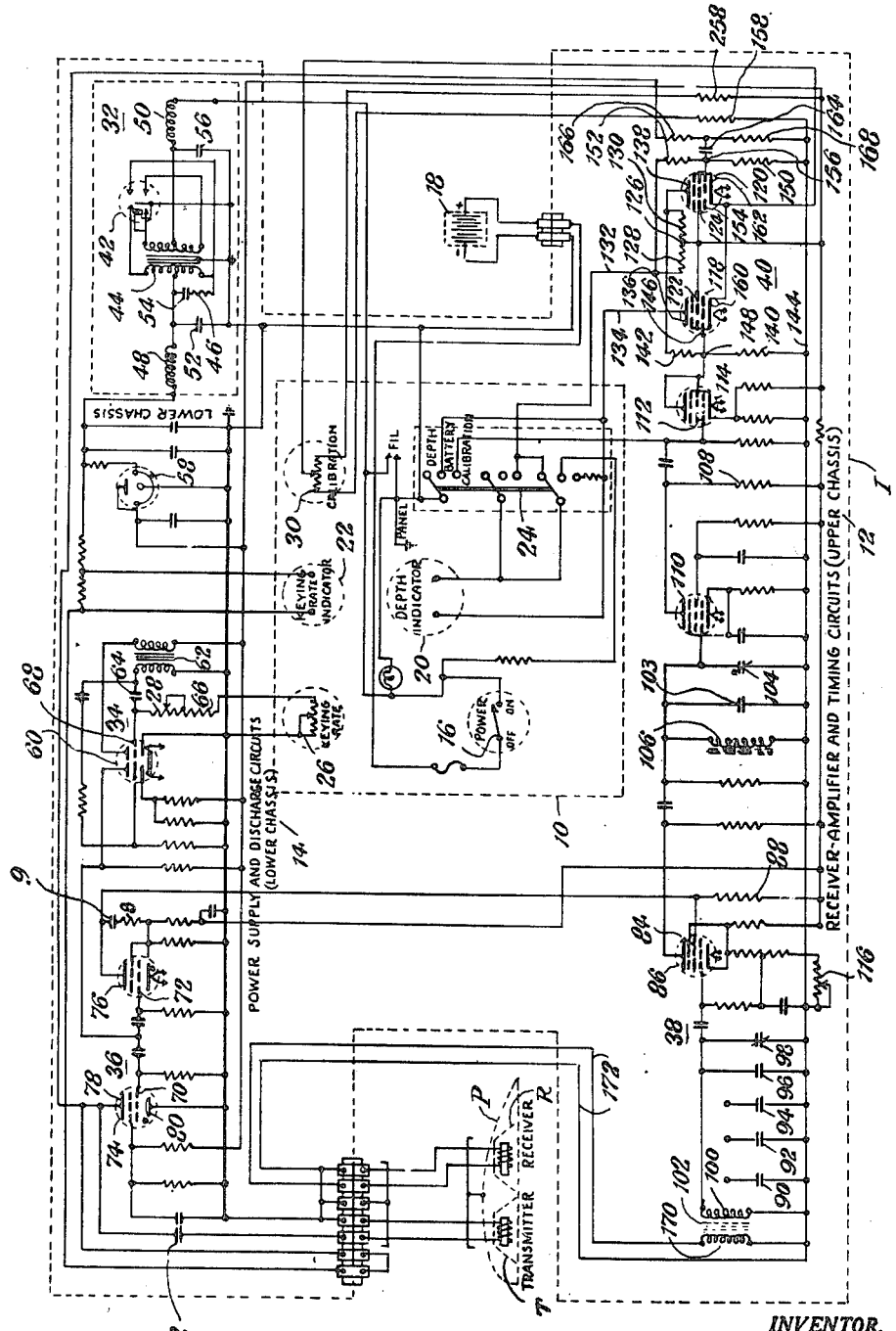

2,446,960

UNITED STATES PATENT OFFICE 2,446,960

ECHO SOUNDING INDICATOR

Fred L. Seebinger, Jr., Vallejo, Calif., assignor to International Projector Corporation, New York, N. Y., a corporation of Delaware Application March 10, 1945, Serial No. 582,149

6 Claims. (Cl. 177—386)

This invention relates to echo sounding and particularly to rapid and automatic water depth determination under a vessel.

In such art it is customary to transmit a signal from the vessel and obtain a reflection back to the vessel from the sea bed the distance of which is to be determined. The interval of time between the transmission of the signal and the reflection back to the vessel gives an indication of the depth of the water under the vessel.

One object of the invention is to provide a lightweight and portable depth indicator which is suitable for war-time use in invasion barges and the like, and for peace-time use on fishing boats and other small craft.

Another object of the invention is to provide a continuous depth finder which does not require the use of motors, and includes novel means for measuring with a direct current meter, the time between the instant of transmission and the instant of receiving the first echo.

A further object is to provide an electronic echo sounding instrument which can be operated from a battery as the only source of power, and which involves the use of small vacuum tubes.

A still further object of the invention is to provide a novel squelch circuit for inhibiting the undesired effect of direct communication between the transmitter and receiver in the water.

In accordance with the invention, for example, there is provided a portable instrument for the rapid, automatic determination of depths of water up to a maximum distance, such as 100 feet, for example, below an outboard projector; comprising a pulse transmitter, an echo receiver, and means for indicating sea bed contour changes along the vessel's course. The instrument generates supersonic sound pressure waves having a constant frequency of 25.0 kc., for example, at a predetermined constant rate of twelve per second, for example; projects the pulses downward; times them accurately in units of depth in their path of travel to the sea bed and return, by reflection; and indicates the water depth directly in feet on a calibrated meter. Operation of the sounding indicator is entirely automatic.

The accompanying drawing is a diagrammatic view of an echo sounding circuit exemplifying the invention.

The illustrated circuit includes a sounding indicator I and an outboard projector P. The outboard projector P contains a magnetostriction type oscillator transmitter T and receiver R in the same housing. The transmitter T converts the generated electrical impulses into sound pressure waves and projects them downward to the "bottom," while the receiver R converts the reflected sound pressure waves into electrical impulses. The outboard projector P is adapted to be swung over the side of the boat and positioned under the water line for observations.

The sounding indicator I is housed in a box containing an instrument panel 10 and an upper chassis 12 and a lower chassis 14, all of which are arranged so as to be readily accessible. On the panel 10 are mounted a power switch 16, which controls the power supply from a six volt battery 18 to the entire unit; a depth indication meter 20, which indicates the depth of water below the outboard projector directly in feet and is also used to check the battery and calibrate the instrument; a keying rate indicator 22, which indicates the sounding rate by a vibrating reed, for example; and a three-position test switch 24.

The keying rate indicator 22 has five reeds, the center reed being designated by an arrow and the left and right outer reeds "slow" and "fast," respectively, thereby indicating directly the keying rate per second by the vibration of a reed. By adjusting a keying rate potentiometer 26 on the panel 10 and a potentiometer 28, on the lower chassis 14, the keying rate may be adjusted precisely to the predetermined constant value, in this case twelve pulses per second, which corresponds to maximum amplitude of the center reed. The keying rate potentiometer 26 provides for adjustment through rather narrow limits, additional adjustment being provided by the potentiometer 28. The keying rate should be accurately adjusted as any error in this adjustment affects the depth readings in the same proportion.

The three-position switch 24 is of the spring return type, being normally in the "depth" position for depth indications. In "battery" position, the charge of the battery 18 may be checked on the meter 20. In "calibration" position, a "calibration" potentiometer 30 on the panel may be adjusted, so that the pointer is in exact alignment with a predetermined mark. This adjustment should also be very carefully made, as any error affects the accuracy of the soundings in the same proportion.

The lower chassis 14 contains a vibrator plate power supply 32 for the unit; a blocking oscillator 34, which initiates the electrical pulses; and a discharge circuit 36. The upper chassis 12 contains a receiver-amplifier circuit 38 and a timing circuit 40. The plate power supply 32 is a separate chassis type unit mounted on the lower chassis. It contains a synchronous vibrator 42; a transformer 44; and associated resistor 46, inductors 48 and 50, and capacitors 52, 54 and 56 for filtering purposes. The output voltage of unit 32 is controlled by a voltage regulator tube 58 for all component circuits except the discharge circuit 36.

The sending of pulses, or keying, is controlled by that half of vacuum tube 60, which is associated with transformer 62, capacitor 64, resistor 66, and potentiometers 28 and 26. These elements comprise the vacuum tube oscillator 34, which would normally oscillate at an audio frequency. The circuit is so designed, however, that in endeavoring to oscillate the grid 68 draws current, develops a high negative bias and blocks itself. An impulse is transmitted each time this blocking takes place. The rate at which blocking occurs is adjustable by means of potentiometers 26 and 28 as previously described. Thus, by careful adjustment of these two potentiometers, the keying rate may be accurately set at 12 pulses per second.

The other half of tube 60 amplifies these pulses and transmits them simultaneously to the grids 70 and 72 of a grid-controlled gaseous-discharge tube (strobotron) 74, and a gas-filled grid-controlled rectifier tube such as a thyratron 76. Each pulse on the grid 70 of tube 74 fires or ionizes the gas in such tube, forming a conducting path from anode 78 to cathode 80 and thereby discharging a capacitor 82 therethrough and energizing the transmitting projector T. The thyratron 76 controls the voltage on the screen 84 of a screen-grid amplifier tube 86 on the upper chassis 12. At the instant the pulse is applied to the grid 72 of thyratron 76, it ionizes the gas in such tube, and the plate current flow through thyratron 76 lowers the screen voltage on tube 86 by the IR drop through an associated plate and screen resistor 88. When tube 76 fires, condenser 9 discharges through tube 76 and resistor 8, the condenser 9 and resistor 8 forming a delay network. At the same time the condenser 9 tends to recharge from the positive side of the power supply through resistor 88 but the time constant of the later circuit is so adjusted with respect to the time constant of the circuit consisting of resistor 8 and condenser 9 that the discharge current exceeds the charging current and the anode potential of tube 76 is reduced to a point where the tube ceases to fire, the maximum current through the limiting resistor being insufficient to maintain an arc in tube 76. When tube 76 ceases to fire condenser 9 is gradually charged through resistor 88 and the screen voltage of tube 86 is gradually returned to its original value, the time being determined by the time constant of the circuit consisting of resistor 88 and condenser 9. This drop of short duration in screen voltage reduces the gain of the receiver-amplifier 38 for said period of short duration so that a false indication of depth, due to direct transmission from the transmitting to the receiving projector, is avoided. The condenser 9 reacts on tube 86 in such a manner as to perform the functions of an automatic gain or volume control.

Crosstalk which would be indicated on the meter 20 as a steady very low depth reading regardless of the true depth of the water may be due to a variety of causes, such as, the direct transmission between transmitter T and receiver R, electrical coupling between the leads to the transmitter and receiver, reverberation in the housing of the outboard projector P and the like. For any particular installation, therefore, it is necessary to provide a control which will maintain the gain of tube 86 below a level which would transmit crosstalk until the effects which produce such crosstalk have disappeared. To this end the potential of the cathode of tube 86 is made adjustable so that the relative potential between the cathode and screen grid, which relative potential constitutes the means for reducing the gain when signals are transmitted, may be varied to accommodate various situations that may arise. This adjustment is provided by the potentiometer 116 in the cathode circuit of tube 86 which in adjusting the potential of the cathode with respect to ground likewise adjusts the relative potential existing between the cathode and screen grid. By proper adjustment the relative potential between cathode and screen grid may be so regulated that this potential does not rise to a value that would permit signals to be amplified by tube 86 until after the conditions which would produce crosstalk have ceased. In other words, potentiometer 116 adjusts the gain level and hence the crosstalk threshold of tube 86. In practice an initial regulation of potentiometer 116 for any given installation is all that is usually necessary.

The three-stage receiver-amplifier 38 on the upper chassis 12 is tuned to a frequency of 25.0 kc., the natural period of the projectors T and R, by capacitors 90 to 98, inclusive, connected across the secondary 100 of an input transformer 102, and also by capacitors 103 and 104, connected across a second stage coupling inductor 106. Resistance coupling 108 is employed from the second to the third stage. The received electrical pulse, from the reflected signal or "echo," is amplified by amplifier tube 86 (its screen voltage returning to normal, as determined by the product of the resistance and capacitance in the plate circuit of tube 76, before the "echo" from deep water is received) and amplifier tube 110 applied to the grid 112 of amplifier tube 114.

Tube 114 is biased beyond cut-off, so that any extraneous noises will not give false depth indications, as several volts of signal are required for operation of the tube. The plate voltage of tube 114 is the same, with respect to ground, as the grid voltage of a grid-controlled space discharge device or vacuum tube 118 in the timer circuit 40. Therefore, as soon as tube 118 ceases to draw plate current, as described below, the plate voltage of the amplifier tube 114 is reduced to the extent that this latter tube is inoperative and even a very strong signal or any extraneous noises picked up by the receiver-amplifier 38 will not cause false operation of the timing circuit 40.

Grid-controlled space discharge devices such as screen-grid vacuum tubes 118 and 120 and their immediately associated circuit elements, constitute the time measuring or trigger circuit 40. They measure the ratio of the time necessary for a pulse to be transmitted to the "bottom" and be reflected back to the receiving projector, to the time between pulses. A potential of plus 150 volts D. C., with respect to ground, is applied to the screens 122 and 124 of tubes 118 and 120, and also to the junction 126 of resistors 128 and 130. The other end of resistor 128 is connected by conductors 132 and 134 through meter 20 to the plate 136 of tube 118. The other end of resistor 130 is connected to the plate 138 of tube 120. Resistors 140 and 142 are connected in series circuit relation between the plate 138 of tube 120 and ground 144, the grid 146 of tube 118 being connected to their junction 148, and thus this grid 146 is positive with respect to ground. In a similar manner resistors 150 and 152 are in series between the plate side of resistor 128 and ground 144, and the grid 154 of tube 120 is connected to their junction 156, so that this grid 154 is likewise positive with respect to ground.

Plate and screen currents of both tubes 118 and 120 flow through the "calibration" potentiometer 30 and a resistor 158 to ground 144, so that the cathodes 160 and 162 of both of these tubes are also positive with respect to ground. Thus a "trigger" circuit 40 is provided, which permits only one of the plate or output circuits of tubes 118 and 120 to draw current at a time. The resistor 158 is used to stabilize the voltage of cathodes 160 and 162 of tubes 118 and 124. The grid of the other tube is biased beyond cut off until some disturbing voltage, such as that resulting from the transmitting pulse, or the "echo," upsets the balance and then the other tube draws plate current while the first is biased off. The potentiometer 30 is variable so that, when the tube 118 is drawing current, its plate current may be adjusted to a certain steady value, in this case two milliamperes. At all times the grids 146 and 154 of tubes 118 and 120 are negative with respect to their cathodes 160 and 162.

When the instrument is in operation, tube 120 draws current during the short interval between receipt of the "echo" and the sending out of the next pulse and its grid 154 is slightly negative with respect to its cathode 162. At the same time, due to the IR drop through resistor 130, the grid voltage of tube 118 is so low that this tube is biased beyond cut off and draws no plate current. Also the plate voltage of amplifier tube 114 (which voltage is the same as the grid voltage of tube 118) is so low that all signals are effectively prevented from passing to the grid 146 of tube 118.

The grid 154 of tube 120 is coupled to the anode 78 of the gas-filled tube 74 on the lower chassis 14 by means including capacitor 164 and resistors 166 and 168 so that a pulse on the anode 78 of tube 74 is impressed on the grid 154 of tube 120. This pulse, being amplified by tube 120, reduces the bias on the grid 146 of tube 118 so that this tube 118 begins to draw current. Due to the resulting IR drop through resistor 128, the voltage on the grid 154 of tube 120 is reduced so that this tube 120 is biased beyond cut off and, therefore, ceases to draw current. The amplified received impulse, or "echo" is impressed on the grid 112 of tube 114, overrides its bias and since its plate voltage is normal the tube draws current. The echo pulse then passes to the grid 146 of tube 118, is amplified by such tube and impressed on the grid 154 of tube 120. The pulse reduces the grid bias on tube 120, and the tube 120 begins to draw current immediately. Tube 118 then is immediately biased off, as previously described, and ceases to draw current. Thus, the circuits are established for the next pulse from the anode 78 of tube 74.

At the instant tube 118 begins to draw current, its plate current of 2 milliamperes flows through meter 20 and at the instant the received pulse is impressed on the grid 146 of tube 118 this current ceases to flow. Thus, current flows through the meter 20 only during the interval of time required for the transmitted signal to reach the bottom and be reflected back to the receiver R. The average value of the plate current of tube 118 over a series of successive energizations thereof is, therefore, proportional to depth. In the present example, for a depth of 100 feet this average value is 1 milliampere, for 50 feet it is 0.5 milliampere, etc. The meter 20 is specially designed so that it gives a steady reading of this average current on a scale calibrated directly in terms of depth such as feet.

The transmitting projector T converts electrical impulses received from the discharge of capacitor 82 in the sounding indicator I, into sound pressure waves, which pass through the water to the "bottom" and are reflected back to the receiving projector R. Each projector consists of a stack of toroidal nickel laminations, wound with wire through which the electrical impulses pass. Each pack is housed in a conical reflector, which is filled with castor oil and sealed by means of a diaphragm and suitable gasket against leakage.

The electrical impulses set up a magnetic field in the laminations of the transmitting projector, causing the nickel to contract as the field increases and expand as the field decreases, thus setting up mechanical vibrations or sound pressure waves, which are transferred to the castor oil within the conical reflector. This effect is known as "magnetostriction." These pressure waves are then reflected, by the conical reflector, in a parallel-vertical beam; travel through the diaphragm to the "bottom" where they are reflected back to the diaphragm of the receiving projector. The received sound pressure waves reach the conical reflector surrounding the receiver pack and are deflected to the pack to set up vibrations within the nickel laminations.

The receiver pack differs from the transmitter pack in that it should be pre-magnetized by a momentary impulse of direct current. Vibrations set up by the sound pressure waves cause contraction and expansion of the pack, a change in the magnetic field and thus an electrical impulse is generated in the pack winding. This electrical impulse is then transmitted to the primary 170 of transformer 102 in the sounding indicator I through the inter-connecting wiring 172.

The natural frequency of both packs may be 25.0 kc., which is outside the frequency of interfering noises, such as those caused by chafing objects and the like.

Operation of the unit is entirely automatic, requiring only the switching on of the power and an occasional check of the keying rate and calibration. A pulse, generated by the blocking oscillator 34, ionizes the gaseous discharge tube (strobotron) 74, thereby discharging the capacitor 82 through the transmitting projector T and initiating the sound pressure wave. The reflected wave, or "echo" reverts to an electrical impulse, by virtue of the action of the receiving projector R, is amplified by circuit 38 and translated, by means of electronic timing circuit 40, into a reading of the depth in feet on the depth indication meter 20 in the sounding indicator I.

The principle of operation of the invention has been described, together with apparatus which now is considered to represent the best embodiment thereof, but it should be understood that the apparatus shown is only illustrative and that the invention may be carried out by other means. Certain features of the invention which are believed to be novel and patentable are defined in the following claims and other inventive features are claimed in the copending application of George T. Lorance, entitled Echo sounding indicator, Serial No. 582,117, filed March 10, 1945.

I claim:

1. In combination, an echo sounding transmitter circuit including means for electronically generating and transmitting pulses at a constant frequency and fixed rate, a gas-filled grid-controlled tube, circuit means for impressing said electronically generated pulses on the input circuit of said gas-filled grid-controlled tube causing it to fire each time a pulse is transmitted, an echo sounding receiver circuit including a screen-grid vacuum tube amplifier having a screen-grid circuit, a resistance connected in said screen-grid circuit and in the output circuit of said gas-filled grid-controlled tube for reducing the gain of said amplifier, when said gas-filled tube fires, to such an extent that said receiver circuit is incapable of passing pulses transmitted directly from said transmitting means to said receiver circuit, and means for restoring the gain of said amplifier before an echo pulse is received.

2. In combination, an echo sounding transmitter circuit including means for electronically generating and transmitting pulses at a constant frequency and fixed rate, a gas-filled grid-controlled tube, circuit means for impressing said electronically generated pulses on the input circuit of said gas-filled grid-controlled tube causing it to fire each sime a pulse is transmitted, an echo sounding receiver circuit including a vacuum tube amplifier, a resistance connected in a grid circuit of said amplifier and in the output circuit of said gas-filled grid-controlled tube for reducing the gain of said amplifier, when said gas-filled tube fires, to such an extent that said receiver circuit is incapable of passing pulses transmitted directly from said transmitting means to said receiver circuit, and means for restoring the gain of said amplifier before an echo pulse is received.

3. In combination, an echo sound transmitter circuit including a blocking oscillator for generating pulses at a fixed rate, a first gas-filled grid-controlled tube having its input connected to the output of said blocking oscillator, a transmitter and a condenser connected in series in the output circuit of said first gas-filled grid-controlled tube whereby the firing of said tube by said blocking oscillator causes said condenser to discharge through said tube and said transmitter resulting in the transmission of pulses in timed relation to the pulses generated by said blocking oscillator, a second gas-filled grid-controlled tube having its input connected to the output of said blocking oscillator so as to fire each time said first gas-filled grid-controlled tube fires, an echo sounding receiver circuit connected to receive and amplify reflected pulses transmitted by said transmitter, said echo sounding receiver circuit including an amplifier tube, a resistance connected in a grid circuit of said amplifier tube and in the output circuit of said second gas-filled grid-controlled tube for reducing the gain of said amplifier when said second gas-filled grid-controlled tube fires to such an extent that said receiver is made incapable of transmitting pulses directly transmitted by said transmitter, and means for restoring the gain of said amplifier before reflected pulses transmitted by said transmitter are received.

4. A combination according to claim 3 in which said means for restoring the gain of said amplifier comprises a resistance and condenser connected between the anode and cathode of said second gas-filled grid-controlled tube whereby after a time interval controlled by the rate of discharge of said condenser, the potential on said anode is reduced to such an extent that said second gas-filled grid-controlled tube ceases to fire.

5. In combination, an echo sounding transmitter circuit including a blocking oscillator for generating pulses at a fixed rate, a first gas-filled grid-controlled tube having its input connected to the output of said blocking oscillator, a transmitter and condenser connected in series in the output circuit of said first gas-filled grid-controlled tube whereby the firing of said tube by said blocking oscillator causes said condenser to discharge through said tube and said transmitter resulting in the transmission of pulses in timed relation to the pulses generated by said blocking oscillator, a second gas-filled grid-controlled tube having its input connected to the output of said blocking oscillator so as to fire each time said first gas-filled grid-controlled tube fires, an echo sounding receiver circuit connected to receive and amplify reflected pulses transmitted by said transmitter, said echo sounding receiver circuit including a screen-grid amplifier tube having a screen grid circuit, a resistance connected in said screen grid circuit and in the output circuit of said second gas-filled grid-controlled tube for reducing the gain of said amplifier when said second gas-filled and grid-controlled tube fires to such an extent that said receiver is made incapable of transmitting pulses directly transmitted by said transmitter and means for restoring the gain of said amplifier before reflected pulses transmitted by said transmitter are received.

6. A combination according to claim 5 in which said means for restoring the gain of said amplifier comprises a resistance and condenser connected between the anode and cathode of said second gas-filled grid-controlled tube whereby after a time interval controlled by the rate of discharge of said condenser, the potential on said anode is reduced to such an extent that second gas-filled grid-controlled tube ceases to fire.

FRED L. SEEBINGER, JR.

REFERENCES CITED

The following references are of record in the file of this patent:

UNITED STATES PATENTS

| Number | Name | Date |
|---|---|---|
| 2,009,459 | Turner | July 30, 1935 |
| 2,055,883 | Terry | Sept. 29, 1936 |
| 2,131,993 | Wittkuhns et al. | Oct. 4, 1938 |
| 2,312,934 | Shook | Mar. 2, 1943 |
| 2,346,093 | Tolson | Apr. 4, 1944 |
| 2,371,988 | Granqvist | Mar. 20, 1945 |
| 2,375,283 | Cloud | May 8, 1945 |

FOREIGN PATENTS

| Number | Country | Date |
|---|---|---|
| 497,147 | Great Britain | Dec. 9, 1938 |